V. H. SAFFRY.
ANIMAL TRAP.
APPLICATION FILED JUNE 19, 1918.
1,286,423. Patented Dec. 3, 1918.
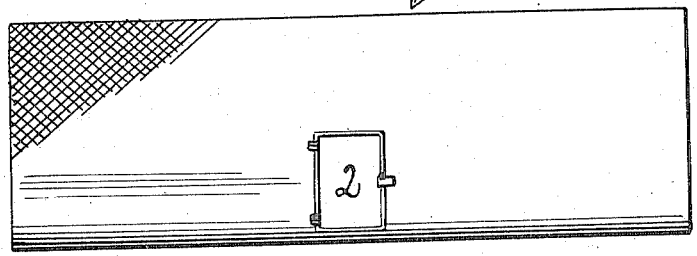
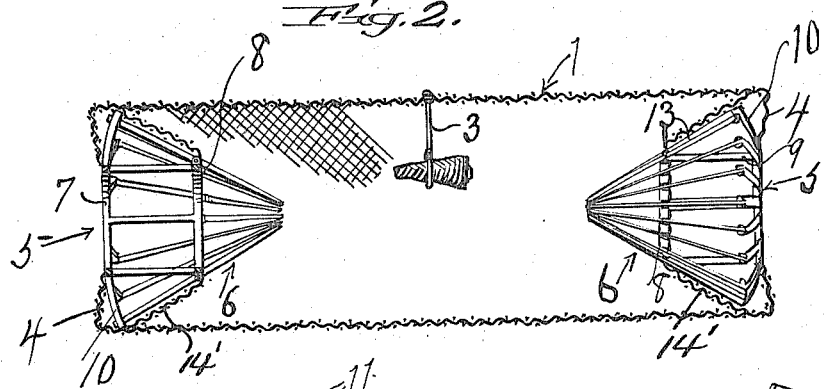
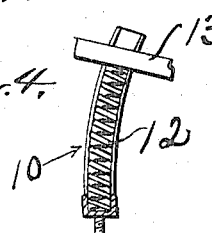
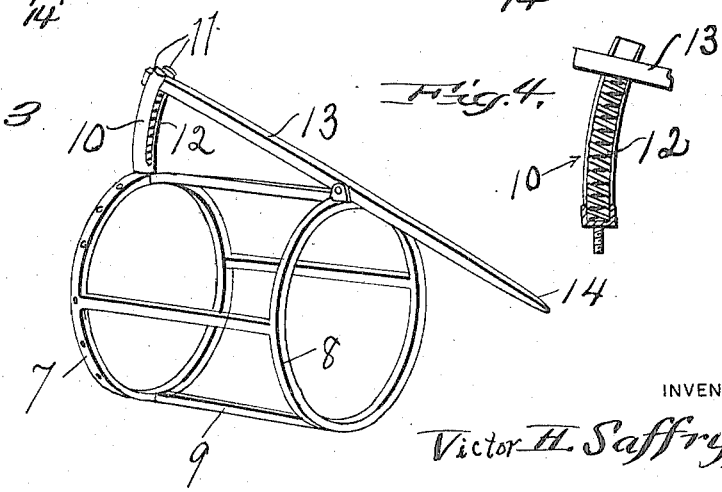
INVENTOR
Victor H. Saffry,
BY Richard Owen,
ATTORNEY
WITNESSES

UNITED STATES PATENT OFFICE.

VICTOR H. SAFFRY, OF ALMA, KANSAS.

ANIMAL-TRAP.

1,286,423.  Specification of Letters Patent.  Patented Dec. 3, 1918.

Application filed June 19, 1918. Serial No. 240,832.

*To all whom it may concern:*

Be it known that I, VICTOR H. SAFFRY, a citizen of the United States, residing at Alma, in the county of Wabaunsee and State of Kansas, have invented certain new and useful Improvements in Animal-Traps, of which the following is a specification.

This invention relates to animal traps, and the primary object thereof is to construct a simple and efficient trap adapted to be placed in the path of an animal to be trapped to obstruct his passage either going or coming.

Another object is to construct such a trap so that the entrance thereto of the animal is facilitated and his exit prevented.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a trap constructed in accordance with this invention, Fig. 2 is a longitudinal section thereof, Fig. 3 is a detail perspective view of one of the cage-like closures for the trap, and Fig. 4 is a detail vertical section of the spring means for holding the closure closed.

In the embodiment illustrated, the trap constituting this invention comprises a casing 1 here shown cylindrical in form, although obviously it may be of any desired configuration in cross section, being open at both ends. A door 2 is mounted in one side wall of the casing, midway its ends to afford access thereto for removing the trapped animals.

Depending from the top of the casing is a bait supporting hanger 3 which may be of any suitable or desired construction.

The casing 1 may be composed of any suitable material either wood or metal, being here shown constructed of wire with inturned flanges 4 at its ends. These flanges 4 surround entrance openings 5 in which are mounted the closures 6. These closures 6 are exactly alike, and hence one only will be described in detail. Each closure comprises a truncated coneshaped skeleton casing or cage when in operative closed position. This cage comprises a pair of annular members 7 and 8 arranged in longitudinal alinement and spaced apart, being held connected by a plurality of bars 9, any desired number of which may be employed, four being here shown. The outer ring 7 is secured to the free edge of flange 4 and has a plurality of spring supports 10 radiating from its outer side face, as is shown clearly in Fig. 3. These supports 10 are here shown arcuate and bifurcated, the furcations 11 forming a housing for a coiled spring 12, which bears at one end against the inner end of the housing and at its outer end against one end of a lever 13 which is positioned between the furcations, as is shown clearly in Figs. 3 and 4. A plurality of these levers 13 are employed, being fulcrumed intermediately of their ends on the ring 8 which is disposed within the casing 6 at a point spaced inwardly from the opening 5. The engagement of the springs 12 with the outer ends of these levers 13 operates to force their inner ends laterally inward toward each other, causing them to converge toward their free ends, which are pointed as shown at 14. This construction affords a yieldable cone-like closure, the prongs 14 being spaced apart a sufficient distance to permit an animal to insert his nose through the vertex of the closure, and the springs 12 are of such slight resiliency as not to interfere with his entrance.

After the animal enters the casing through one of these closures, the springs will force the levers into closed position as shown in Fig. 2, and prevent his return. It will thus be seen that while an animal may enter from either end of the casing, after he once enters he cannot get out, but may be removed through the door 2.

These traps are especially designed for trapping rabbits and similar animals which in cold weather, collect in numbers in dens or holes, and the trap is designed to be placed at the entrance of a den, so that an animal to obtain access thereto, must pass through the trap, or in order to leave the hole he must also enter the trap, so that he is caught either going or coming. While these traps are primarily intended for such disposition, they may be obviously placed at any suitable or desired point where animals desired to be caught are known to frequent.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:—

1. An animal trap having an entrance opening, a ring surrounding said opening, a support carried by and spaced inwardly from said ring, a plurality of levers fulcrumed intermediately of their ends on said support, springs arranged under the rear ends of said levers to force the inner ends toward each other, and a casing encompassing said levers to prevent the operation thereof from the inside.

2. An animal trap having an entrance opening, a ring surrounding said opening, a support carried by and spaced inwardly from said ring, a plurality of levers fulcrumed intermediately of their ends on said support with springs arranged under their rear ends, whereby their inner ends are forced inwardly toward each other.

3. An animal trap having an entrance opening, a cage-like closure therefor comprising a pair of longitudinally spaced rigidly connected rings, one being mounted in said opening and the other positioned within said casing, spring housings radiating from the outer ring and positioned within the casing, a plurality of levers fulcrumed intermediately of their ends on the inner ring with their outer ends positioned in said housings, coiled springs mounted in said housings to exert their tension to force the levers outwardly whereby their inner ends are moved laterally inward converging to form a common vertex.

In testimony whereof I affix my signature in presence of two witnesses.

VICTOR H. SAFFRY.

Witnesses:
I. G. LUNRZ,
G. A. MULLER.

Copies of this patent may be obtained for five cents each, by addressing the "Commissioner of Patents, Washington, D. C."